US012776963B2

(12) United States Patent
Tonry et al.

(10) Patent No.: US 12,776,963 B2
(45) Date of Patent: Oct. 27, 2026

(54) MANAGING USE OF DATA PROCESSING SYSTEMS USING OUT-OF-BAND METHODS

(71) Applicant: Dell Products L.P., Round Rock, TX (US)

(72) Inventors: Richard M. Tonry, Georgetown, TX (US); Abeye Teshome, Austin, TX (US); Mohit Arora, Frisco, TX (US); Bassem El-Azzami, Austin, TX (US); Vinodkumar Vasudev Ottar, Mckinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/425,258

(22) Filed: Jan. 29, 2024

(65) Prior Publication Data

US 2025/0247307 A1 Jul. 31, 2025

(51) Int. Cl.
*H04L 41/344* (2022.01)
*H04L 41/147* (2022.01)
*H04L 41/16* (2022.01)

(52) U.S. Cl.
CPC .......... *H04L 41/344* (2022.05); *H04L 41/147* (2013.01); *H04L 41/16* (2013.01)

(58) Field of Classification Search
CPC ...... H04L 41/344; H04L 41/147; H04L 41/16
See application file for complete search history.

(56) References Cited

U.S. PATENT DOCUMENTS

| | | | |
|---|---|---|---|
| 8,042,182 | B2 | 10/2011 | Milani Comparetti et al. |
| 8,615,785 | B2 | 12/2013 | Elrod et al. |
| 8,924,620 | B2 | 12/2014 | Harriman et al. |
| 9,215,244 | B2 | 12/2015 | Ayyagari et al. |
| 9,529,602 | B1 | 12/2016 | Swierk |
| 9,734,169 | B2 | 8/2017 | Redlich et al. |
| 10,176,308 | B2 | 1/2019 | Mintz et al. |

(Continued)

FOREIGN PATENT DOCUMENTS

WO 2024102715 A1 5/2024

*Primary Examiner* — Tonia L Dollinger
*Assistant Examiner* — Joseph M Cousins
(74) *Attorney, Agent, or Firm* — WOMBLE BOND DICKINSON (US) LLP

(57) ABSTRACT

Methods and systems for managing a data processing system are disclosed. A management controller of the data processing system may provide behavior data for the data processing system to a service system via an out-of-band communication channel. The behavior data may indicate activity of the data processing system ascribed to a user of the data processing system. The management controller may obtain a response from the service system (via the out-of-band communication channel) that indicates whether the activity is expected for the user. If the activity is unexpected for the user, then the activity may indicate undesired use of the data processing system. Therefore, the management controller may initiate performance of an action set that is based on the behavior data in order to manage an impact of the undesired use of the data processing system.

20 Claims, 7 Drawing Sheets

(56) References Cited

U.S. PATENT DOCUMENTS 10,298,670 B2 5/2019 Ben-Shaul et al.
10,599,504 B1 3/2020 BeSerra
10,671,765 B2 6/2020 Swierk et al.
11,036,902 B2 6/2021 Nicholas
11,102,122 B2 8/2021 Seed et al.
11,134,380 B2 9/2021 Fox et al.
11,487,274 B2 11/2022 Valder et al.
11,574,080 B1 2/2023 Khatri
11,792,267 B2 10/2023 Kreiner et al.
2009/0210601 A1 8/2009 Greenstein
2009/0328195 A1 12/2009 Smith
2011/0035526 A1* 2/2011 Slaight .................. G06F 13/385 710/313
2011/0087387 A1 4/2011 Safa-Bakhsh et al.
2012/0266259 A1 10/2012 Lewis
2013/0019239 A1 1/2013 Fontignie
2013/0227543 A1 8/2013 Chen
2014/0304497 A1 10/2014 Park
2017/0052914 A1 2/2017 Aldebert
2017/0357515 A1 12/2017 Bower, III
2018/0039946 A1 2/2018 Bolte et al.
2018/0082065 A1 3/2018 Liu
2018/0137284 A1 5/2018 Oh
2019/0065786 A1 2/2019 Young
2020/0220812 A1 7/2020 Butcher
2020/0351293 A1* 11/2020 Ponnuru ................. H04L 63/20
2021/0034048 A1 2/2021 Hajizadeh
2021/0073211 A1 3/2021 Wright, Sr.
2021/0133329 A1* 5/2021 Andrews ............... G06F 21/577
2021/0397716 A1 12/2021 Kovah
2022/0038659 A1 2/2022 Michel
2022/0276876 A1* 9/2022 Drury ................... G06F 21/572
2023/0130256 A1 4/2023 Savage
2023/0246827 A1 8/2023 Luciani, Jr.
2024/0411938 A1* 12/2024 Emerson ............... G06F 21/575

* cited by examiner

MANAGING USE OF DATA PROCESSING SYSTEMS USING OUT-OF-BAND METHODS

FIELD

Embodiments disclosed herein relate generally to managing data processing systems. More particularly, embodiments disclosed herein relate to systems and methods for managing use of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
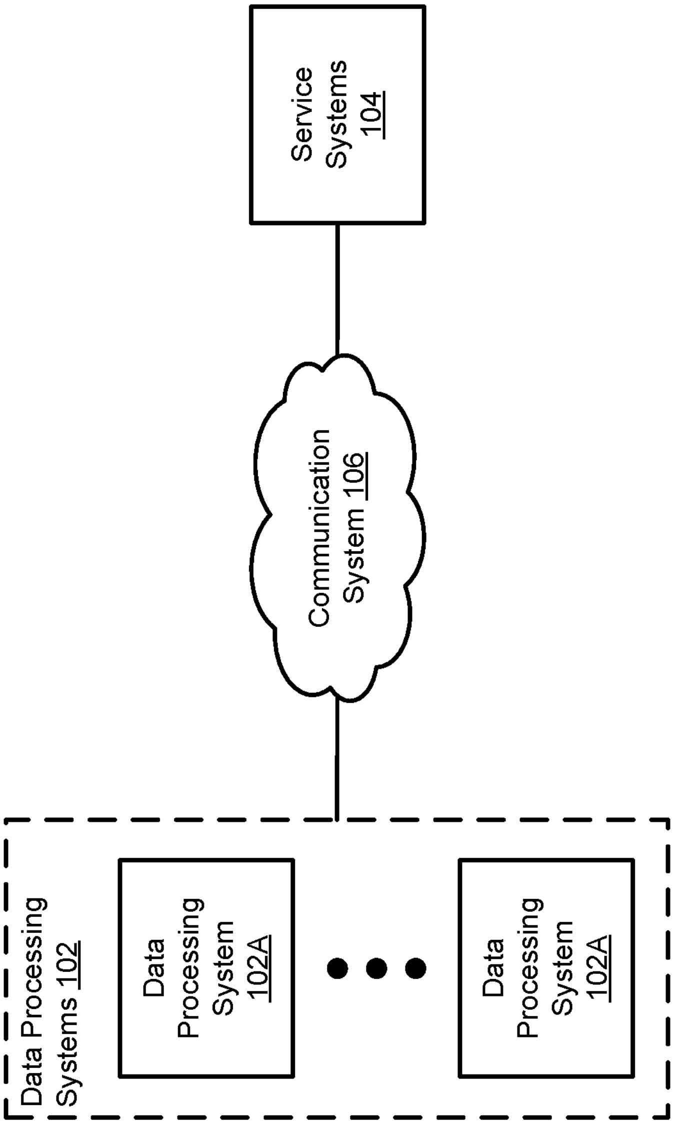
FIG. 1A shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services and may be operated by a user. For example, an authorized user may use the data processing system in a desired manner in order to facilitate provision of desired computer-implemented services.

However, the data processing system may be subject to undesired use. For example, an unauthorized user such as a malicious party may gain control of the data processing system and may use the data processing system in an undesired manner. Undesired use of the data processing system may negatively impact the data processing system (e.g., data stored by and/or accessible to the data processing system, computer-implemented services provided and/or facilitated by the data processing system, etc.). For example, impacts of undesired use of the data processing system may include reduced data security (e.g., inadvertent disclosure of and/or loss of sensitive data, etc.) and/or increased likelihood of interruptions to (or cessation of) the desired computer-implemented services.

To manage impacts of undesired use of the data processing system, activity of the data processing system may be monitored. To do so, a data processing system may include and rely on hardware resources (e.g., in-band components of the data processing system) to perform actions to monitor for, detect, and/or respond to undesired use of the data processing system. However, if the in-band components are compromised (e.g., as part of an attack by a malicious party), then the in-band components may not be reliable to manage impacts of the undesired use.

Thus, use of the data processing system may be managed using out-of-band methods that do not rely on in-band components or in-band communication channels of the data processing system. To do so, the data processing system may include out-of-band components and out-of-band communication channels that function independently from the in-band components. Consequently, if the in-band components and/or communication channels are compromised or non-operational, then the out-of-band components and communication channels may remain available, uncompromised, and reliable to prevent and/or mitigate negative effects of undesired use.

To monitor activity of the data processing system, behavior data of the data processing system may be managed (e.g., collected) by the out-of-band components. The behavior data may indicate activity of the data processing system that may be ascribed to its user (e.g., the activity may reflect user behavior). For example, the behavior data may include location data, hardware resources activity data, user data, access data, and/or other data stored by the data processing system. The behavior data may be provided by the out-of-band components via the out-of-band communication channels to service systems that may analyze the behavior data. The behavior data may be analyzed (e.g., in aggregate) using inference models trained to detect unexpected activity (e.g., undesired use) of the data processing system. If the behavior data indicates that undesired use is likely, then the service systems may prompt the out-of-band components to respond to the undesired use accordingly.

By doing so, embodiments disclosed herein may provide a system for managing use of a data processing system based on behavior data for the data processing system. When the behavior data (e.g., indicating activity of the data processing system) is unexpected for the user, out-of-band components of the data processing system may initiate performance of actions to remediate undesired use. The actions may update operation of the data processing system in accordance with its policies in order to reduce an impact of undesired use of the data processing system, despite potentially unavailable in-band components of the data processing system.

In an embodiment, a computer-implemented method for managing a data processing system is provided. The method may include: providing, by a management controller of the data processing system and via an out-of-band communication channel and to a service system, behavior data for the data processing system, the behavior data indicating activity of the data processing system ascribed to a user of the data processing system; and, obtaining, by the management controller and via the out-of-band communication channel and from the service system, a response to the provided behavior data, the response indicating whether the activity ascribed to the user is expected for the user.

In a first instance of the obtaining where the response indicates that the activity ascribed to the user is unexpected for the user, the method may include: obtaining, by the management controller and via the out-of-band communication channel and from the service system, an action set, the action set being based on the behavior data; and, initiating, by the management controller, performance of the action set to update operation of the data processing system to manage an impact of undesired use of the data processing system reflected in the behavior data.

The behavior data may include at least one type of behavior data from a list of types of behavior data consisting of: location data for the data processing system; activity data indicating operation of hardware resources of the data processing system; user data stored by the data processing system; and access data for the data processing system.

The method may further include performing, by the service system, an inferencing process using the behavior data to obtain the response. The method may further include updating, using an incremental learning method and previously collected behavior data, an aged inference model to obtain an inference model used in the inferencing process.

The activity ascribed to the user that is unexpected for the user may indicate that location data that indicates that the data processing system is located in an unexpected geographical area was obtained.

The action set may include disabling, by the management controller, a portion of hardware resources of the data processing system. The portion of the hardware resources may include a trusted platform module. The action set may include disabling a piece of software hosted by hardware resources of the data processing system.

In a second instance of the obtaining where the response indicates that the activity ascribed to the user is expected for the user, the method may further include continuing, by the management controller, to allow desired use of the data processing system reflected in the behavior data. In the second instance of the obtaining, the response may include a lack of any communication from the service system regarding whether the activity ascribed to the user is expected for the user based on the behavior data.

The data processing system may include a network module adapted to separately advertise network endpoints for the management controller and hardware resources of the data processing system, the network endpoints being usable by the service system to address communications to the hardware resources and the management controller.

The management controller and the network module may be on separate power domains from the hardware resources so that the management controller and the network module are operable while the hardware resources are inoperable.

The behavior data may be provided to the service system while a portion of the hardware resources are inoperable due to being unpowered. The response may be obtained by the management controller while a portion of the hardware resources are inoperable due to being unpowered.

The out-of-band communication channel may run through the network module, and an in-band communication channel that services the hardware resources may also run through the network module.

A non-transitory media may include instructions that when executed by a processor cause the computer-implemented method to be performed.

The data processing system may include the non-transitory media and a processor, and may perform the computer-implemented method when the computer instructions are executed by the processor.

Turning to FIG. 1A, a block diagram illustrating a distributed system in accordance with an embodiment is shown. The (distributed) system shown in FIG. 1A may provide computer-implemented services. The computer-implemented services may include any type and quantity of services including, for example data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. For example, a data processing system of data processing systems 102 (102A) may be operated by a user and may provide a portion of the computer-implemented services. When operated in a desired manner (e.g., by the user), the portion of the computer-implemented services may include desired computer-implemented services (e.g., computer-implemented services that are secure, reliable, trustworthy, etc.). However, the data processing system may be subject to undesired use. For example, undesired use may include operation by an unauthorized user (e.g., a malicious party). Undesired use of the data processing system may negatively impact the data processing system (e.g., data stored thereon) and/or the computer-implemented services provided by the data processing system.

For example, a malicious party may gain access to a data processing system (e.g., of 102) that accesses, generates, and/or stores sensitive data in order to provide computer-implemented services. When used in an undesired manner, the sensitive data may be exposed and/or used for nefarious purposes. In addition, the data processing system may be unable to provide the desired computer-implemented services while under operation of the malicious party.

Therefore, to protect the data processing systems (e.g., from undesired use), activity of the data processing systems may be monitored. Activity of the data processing system may include activity of hardware resources of the data processing system, data accessed and/or generated by the data processing system, a type and/or quality of the computer-implemented services provided by the data processing system, etc. In other words, the activity may reflect use of the data processing system.

To monitor activity of the data processing system, hardware resources of the data processing system may collect and analyze data indicating activity of the data processing system (e.g., behavior data). Based on the analysis of the behavior data (e.g., if the activity indicates the data processing system may be subject to undesired use, then), the hardware resources may respond to undesired use of the data processing system by, for example, updating (e.g., limiting) operation of the data processing system. However, if hardware resources become unavailable (e.g., unpowered, compromised, and/or otherwise inoperable), then the hardware resources may be unable to detect and/or respond to undesired use of the data processing system in a timely and/or appropriate manner. Therefore, to increase the likelihood of detecting and/or responding to undesired use of the data processing system in a timely and appropriate manner, use of the data processing system may be managed using out-of-band methods.

In general, embodiments disclosed herein may provide methods, systems, and/or devices for managing use of a data processing system using out-of-band methods. The data processing system may include out-of-band components that may communicate with remote service systems without traversing in-band communication channels and without utilizing in-band components. For example, the out-of-band components may manage behavior data for the data processing system, and may manage performance of actions in response to undesired use of the data processing system based on the behavior data. By doing so, potentially compromised or inoperable in-band components may be circumvented, increasing the likelihood of effectively managing impacts of undesired use of the data processing system.

To perform the above-mentioned functionality, the system of FIG. 1A may include data processing systems 102, and/or service systems 104. Data processing systems 102, service systems 104, and/or any other type of devices not shown in FIG. 1A may perform all, or a portion of the computer-implemented services independently and/or cooperatively. Each of these components is discussed below.

Data processing systems 102 may include any number and/or type of data processing systems (e.g., 102A-102N). Any of data processing systems 102 may be operated by users and/or may provide computer-implemented services based on the users' operation. Any of data processing systems 102 may include in-band components (e.g., hardware resources) and out-of-band components (e.g., a management controller, a network module, etc.), and functionality that may allow the out-of-band components to communicate with remote systems independently from the in-band components. For more information regarding out-of-band components of data processing systems 102, refer to the discussion of FIG. 1B.

For example, out-of-band components such as a management controller of a data processing system (e.g., of 102) may (i) collect behavior data (e.g., via a sideband communication channel established between the management controller and hardware resources of the data processing system), (ii) provide information to remote systems (e.g., behavior data, via an out-of-band communication channel established between the management controller and the remote system), (iii) obtain information from the remote systems (e.g., responses to the behavior data, via the out-of-band communication channel), (iv) initiate processes for updating operation of the data processing system (e.g., performance of an action set based on the behavior data, via the sideband communication channel) to manage impacts of undesired use of the data processing system, and/or (v) perform other actions (e.g., that may relate to facilitating the data processing system providing desired computer-implemented services).

Service systems 104 may include any number and/or type of systems (e.g., devices) that may provide computer-implemented services. For example, one or more of service systems 104 may provide behavior analysis services for a data processing system of data processing systems 102. To provide the behavior analysis services, service systems 104 may manage inference models usable to analyze behavior data for the data processing system.

For example, to manage inference models, any of service systems 104 may (i) obtain training data (e.g., historical behavior data for data processing systems 102) usable to train an inference model to analyze activity of a data processing system, (ii) perform training processes in order to train inference models using the training data (e.g., the historical behavior data), (iii) perform model update processes in order to further train previously trained inference models, (iv) perform inferencing processes in order to generate inferences regarding the current activity of the data processing system, and/or (v) other actions that may facilitate the management and/or use of inference models. Refer to the discussion of FIG. 2A for more information regarding inference models.

To perform the behavior analysis services, service systems 104 may communicate (e.g., exchange data) with out-of-band components of data processing systems 102 via out-of-band communication channels. For example, a system of service systems 104 may (i) obtain behavior data for a data processing system from a management controller of the data processing system via the out-of-band communication channel, (ii) perform a behavior analysis process using the behavior data (e.g., in order to monitor activity and/or use of the data processing system, (iii) obtain a response to the behavior data (e.g., based on the behavior analysis process and/or policies for the data processing system), (iv) provide the response to the management controller via the out-of-band communication channel, and/or (v) perform other actions (e.g., provide notifications to other systems regarding the activity and/or the use of the data processing system). Refer to the discussion of FIG. 2B for more information regarding managing use of data processing systems.

Thus, the use of data processing systems 102 may be managed using out-of-band methods (e.g., using out-of-band components and via out-of-band communication channels) instead of relying on in-band components and/or in-band communication channels of data processing systems 102. Unexpected activity (e.g., undesired use) of data processing systems 102 may be more likely to be detected and responded to (e.g., in a timely manner) when using the out-of-band methods. By doing so, impacts of undesired use of data processing systems 102 may be more likely to be mitigated and/or prevented.

Figure 3A:
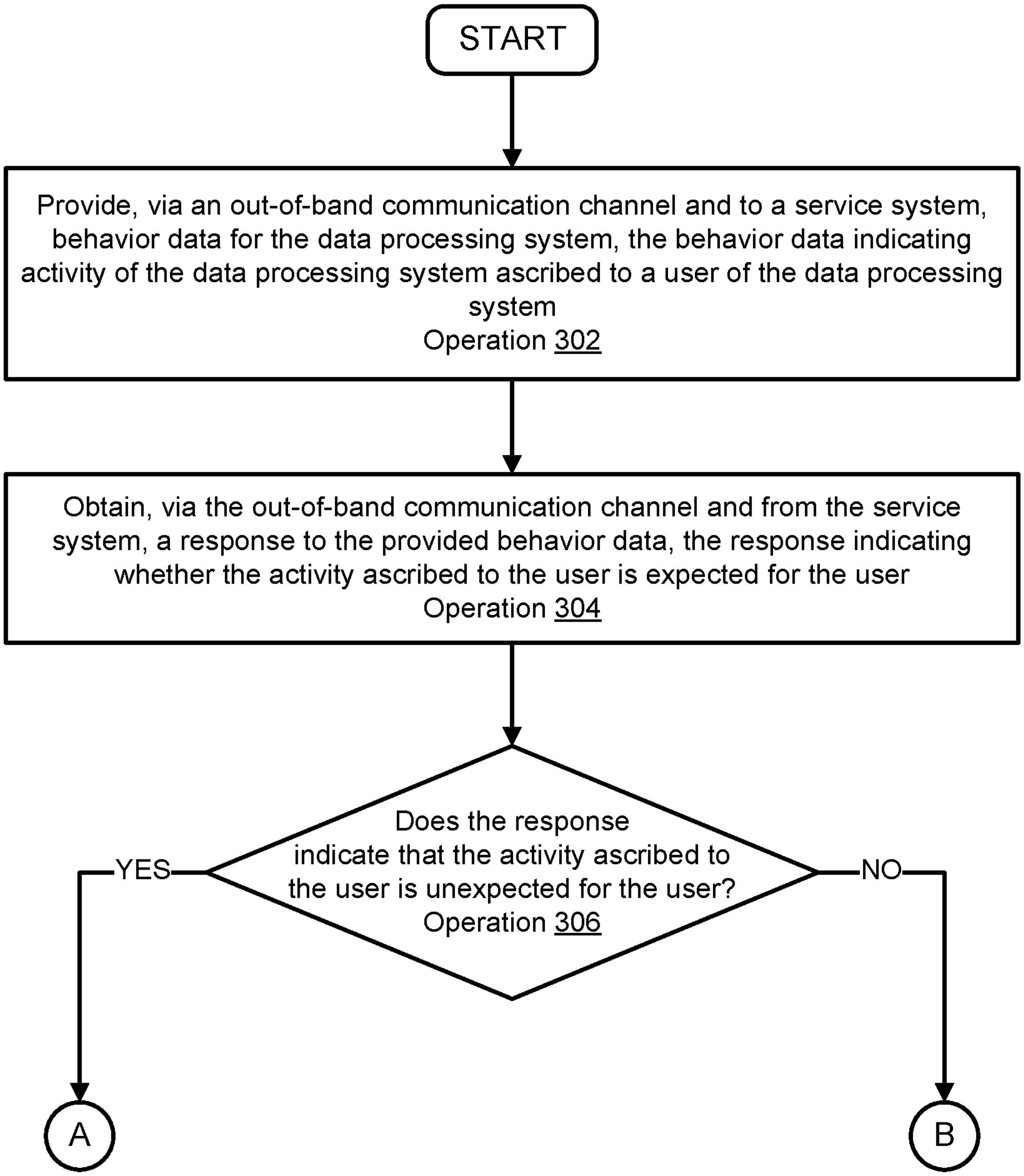
FIGS. 3A-3B show a flow diagram illustrating a method in accordance with an embodiment.
Figure 3B:
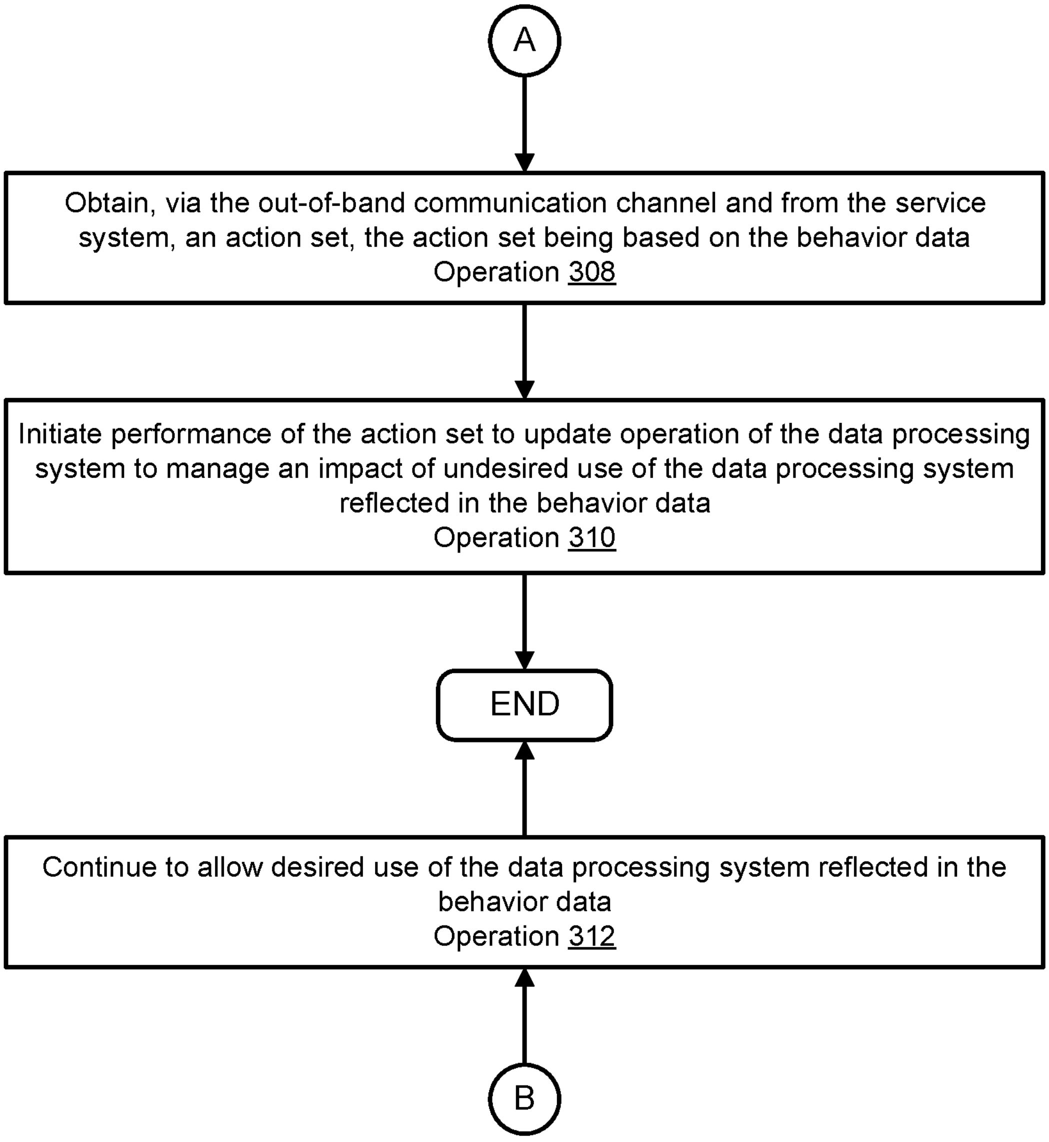

When providing their functionality, any of data processing systems 102 and/or service systems 104 may perform all, or a portion of the methods shown in FIGS. 3A-3B.

Any of (and/or components thereof) data processing systems 102 and/or service systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing systems 102 and/or service systems 104 are implemented using an internet of things (IoT) device, which may include a computing device. The IoT device may operate in accordance with a communication model and/or management model known to data processing systems 102, service systems 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein.

Figure 1B:
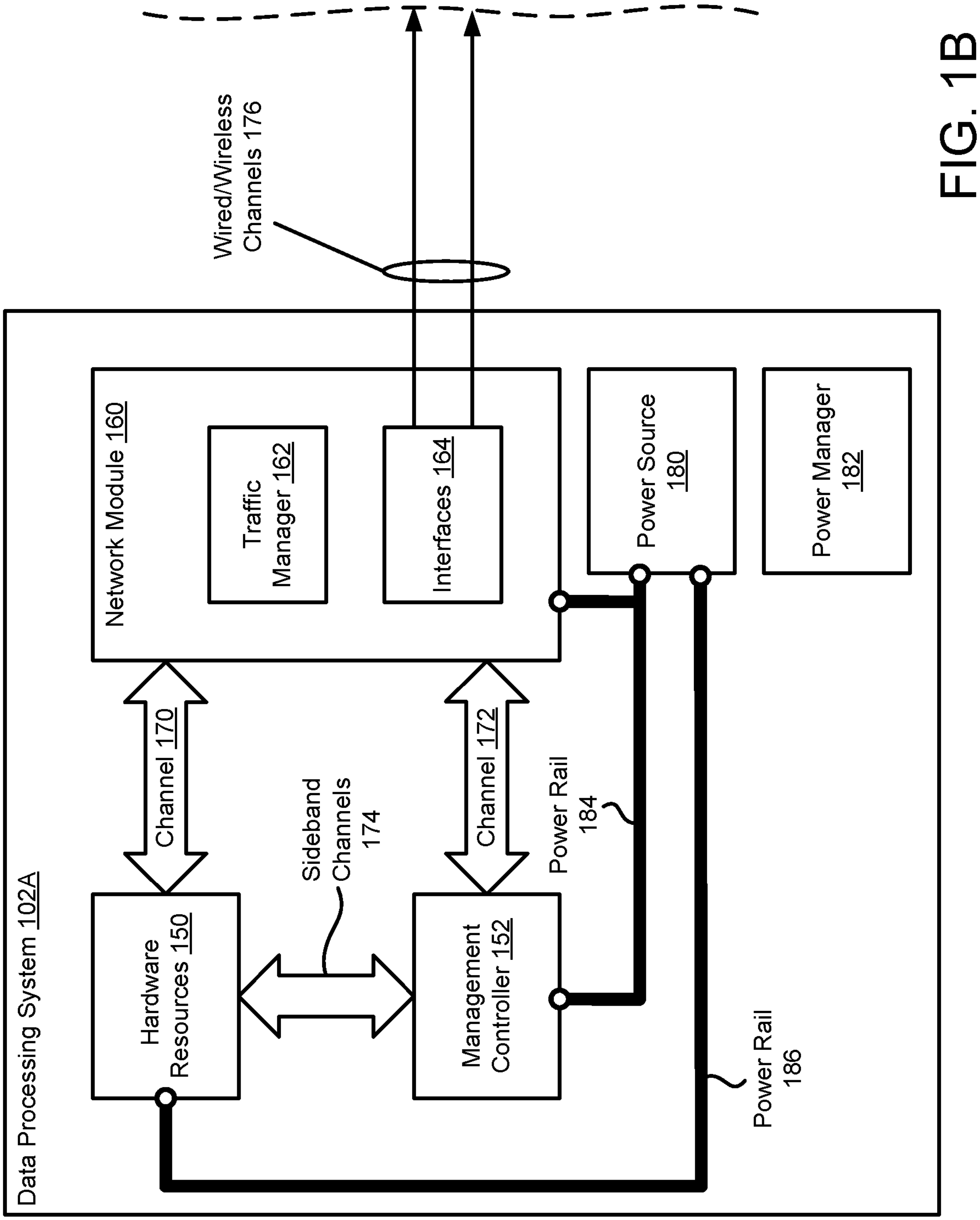
FIG. 1B shows a block diagram illustrating a data processing system in accordance with an embodiment.

Turning to FIG. 1B, a diagram illustrating a data processing system in accordance with an embodiment is shown. Data processing system 102A shown in FIG. 1B may be similar to any of the computing devices shown in FIG. 1A (e.g., one of data processing systems 102).

To provide computer-implemented services, data processing system 102A may include any quantity of hardware resources 150. Hardware resources 150 may be in-band hardware components, and may include a processor operably coupled to memory, storage, and/or other hardware components.

When operating, any of these components may generate log data (e.g., data structures that may include documentation of events relevant to hardware resources 150). Log data may include time-stamped descriptions of conditions encountered by a component and/or other types of information usable to track activity of data processing system 102A. For example, log data may generally include a representation of current and/or past operation of all or a portion of hardware resources 150. Log data (e.g., event logs, access logs, system logs, resource logs, etc.) may be generated by data processing system 102A and may be stored in hardware resources 150 along with other data, such as user data.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102A) to another device via any number of intermediate networks (e.g., via wired/wireless channels 176 that are part of the networks).

To reduce the likelihood of the applications and/or other in-band entities from being indirectly compromised, data processing system 102A may include management controller 152 and network module 160. Each of these components of data processing system 102A is discussed below.

Management controller 152 may be implemented, for example, using a system on a chip or other type of independently operating computing device (e.g., independent from the in-band components, such as hardware resources 150 of a host data processing system 102A). Management controller 152 may provide various management functionalities for data processing system 102A. For example, management controller 152 may monitor various ongoing processes performed by the in-band components, may manage power distribution, thermal management, and/or may perform other functions for managing data processing system 102A (e.g., initiating performance of actions for updating operation of hardware resources 150).

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

For example, if hardware resources 150 are compromised as part of an attack, then management controller 152 may autonomously initiate impact management processes that may modify (e.g., limit) the operation of hardware resources 150 in a manner that may mitigate an outcome of the attack.

To facilitate communication with other devices, data processing system 102A may include network module 160. Network module 160 may generate location data and/or provide communication services for in-band components and out-of-band components (e.g., management controller 152) of data processing system 102A. To do so, network module 160 may include traffic manager 162, and interfaces 164.

Traffic manager 162 may include functionality to (i) discriminate traffic directed to various network endpoints advertised by data processing system 102A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, a service system (e.g., of 104) may address a message to a network endpoint advertised by network module 160 for out-of-band communications. The message may include, for example, a response to analysis of behavior data obtained from data processing system 102A. Once the message is received by traffic manager 162, traffic manager 162 may forward the message to management controller 152 via an out-of-band communication channel (e.g., channel 172), differentiating the message from in-band communications to data processing system 102A. Therefore, the response may be obtained by data processing system 102A by using out-of-band methods and may be less likely to be blocked, intercepted, and/or modified (e.g., by the malicious party) than when using in-band methods.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

To generate location data, network module 160 may include a location identification component (not shown). The location identification component may include a global positioning system (GPS) receiver (e.g., for satellite-based geolocation), a cellular modem or chip (e.g., for cellular-based geolocation using a WWAN), sensors, and/or other types of geolocation components. The location identification component may, for example, transmit and/or receive data across a network via interfaces 164 in order to generate (e.g., triangulate) a location of data processing system 102A. The location data may be forwarded by traffic manager 162 to management controller 152 via an out-of-band communication channel (e.g., channel 172), bypassing potentially compromised and/or unavailable hardware resources 150.

Thus, location data for data processing system 102A may be generated and/or provided by network module 160 independently from hardware resources 150 (e.g., and software hosted by hardware resources 150). Network module 160 may provide location data to management controller 152 automatically based on a schedule, upon (automatic) detection of a change in location data (e.g., based on a displacement threshold), and/or upon obtaining a request for location data (e.g., from management controller 152).

Thus, from the perspective of an external device, the in-band components and out-of-band components of data processing system 102A may appear to be two independent network entities that may be independently addressable and/or otherwise unrelated to one another.

To facilitate management of data processing system 102A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

Therefore, if hardware resources 150 become unavailable (e.g., due to being unpowered) then out-of-band components may remain powered, allowing (i) network module 160 to continue to generate location data for data processing system 102A, (ii) management controller 152 to obtain behavior data (e.g., including the location data), (iii) communications between management controller 152 and remote systems (e.g., via out-of-band communication channels, in order to provide the behavior data to and/or obtain responses from the remote systems), and/or (iv) management controller 152 to initiate and/or perform impact management processes for data processing system 102A.

To implement the separate power domains, data processing system 102A may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
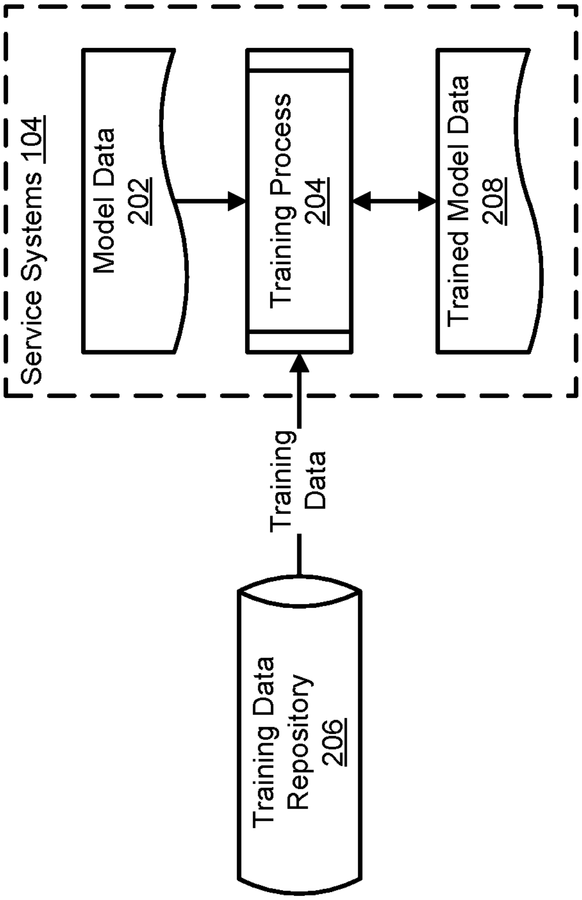
FIG. 2A shows a data flow diagram in accordance with an embodiment.

Turning to FIG. 2A, a data flow diagram in accordance with an embodiment is shown. The data flow diagram may illustrate data used in and data processing performed when obtaining (e.g., generating) inference models. Inference models may be obtained (e.g., trained, updated over time) and used for various purposes, such as for pattern recognition, task automation, decision making, etc. The inference models may, for example, be implemented with artificial neural networks, decision trees, support-vector machines, regression analysis, Bayesian networks, genetic algorithms, and/or any other type of model usable for learning purposes.

Model data 202 (e.g., an untrained inference model) may include information regarding the architecture and/or hyperparameters of a selected inference model type (e.g., optimization algorithm information, hidden layer information, bias function descriptions, activation function descriptions, etc.). An inference model type may be selected based on the goals of the inference consumers or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), (iv) inference characteristics (e.g., accuracy and/or inference type), and/or (v) inference model characteristics (e.g., explainability, interpretability, etc.).

For example, model data 202 may include an untrained classification model that, once trained, may generated inferences that indicate whether activity of a data processing system is "expected" or "unexpected". To obtain the trained inference model, model data 202 may be input to training process 204, along with training data from training data repository 206.

Training data repository 206 may include any number of training datasets associated with any number of users and/or data processing systems. The training data may include historical behavior data for one or more data processing systems and/or one or more users of the data processing systems. For example, the historical behavior data may include behavior data obtained from (e.g., collected by) the one or more data processing systems prior to initiating training process 204 for model data 202. Training data repository 206 may be updated with new training data as it is made available. For more information regarding behavior data collection, refer to the discussion of FIG. 2B.

Behavior data may include any type of data that may indicate activity of the data processing system (e.g., ascribed to behavior of the user). For example, behavior data for a data processing system may include (i) location data (e.g., data usable to determine a physical location of the data processing system), (ii) activity data (e.g., data indicating operation of hardware resources of the data processing system, log data such as availability logs, event logs, etc.), (iii) user data (e.g., data generated by and/or regarding the user, such as calendars, email, etc.), (iv) access data (e.g., access logs and/or other data indicating user requests for data access, application access, etc.), and/or (v) other data that may indicate behavior of the user and/or activity of the data processing system.

The training data stored in training data repository 206 may include data that defines an association between two pieces of information (e.g., an input sample associated with an output sample, the pair being labeled data). For example, portions of the behavior data (e.g., input samples) may be associated with expected (or unexpected) activity for a user of a data processing system (e.g., output samples). In addition, the portions of the behavior data associated with unexpected activity may also be associated with (e.g., tagged, by a user) additional information, such as a type of attack (e.g., a security breach), severity of the attack, type of undesired use (e.g., an intent of the attack), etc. The training data (e.g., labeled behavior data) may be input to training process 204.

Training process 204 may employ machine learning techniques such as supervised learning (e.g., for labeled training data), and/or unsupervised learning (e.g., for unlabeled data). The trained machine learning models may be implemented using other modalities (e.g., semi-supervised learning, reinforced learning, associative rules, etc.). For example, training process 204 may employ supervised learning to train an inference model to associate a desired output sample of the training data with an input sample of the training data. Large numbers of associations may be trained into the AI model (e.g., using various combinations of input samples and output samples from the training data).

During training process 204, model data 202 may be updated based on the training data associations. For example, depending on the type of inference model being updated, values of portions of model data 202 such as coefficient, weight, bias, and/or cluster centroid values of the inference model may be modified. Once model data 202 is updated using the training data, training process 204 may obtain a trained inference model (e.g., trained model data 208). As part of the training process, the trained inference model may undergo a validation and/or testing step to improve and/or measure the reliability of generated inferences. Any number of inference models may be trained using training process 204.

Trained model data 208 may be used during an inference process in order to map an input dataset (e.g., ingest data) to a desired output dataset (e.g., inferences). The input dataset (e.g., ingest data) may differ from the training data that was used to obtain trained model data 208. For example, trained model data 208 may ingest behavior data collected from a data processing system and generate inferences indicating whether activity of the data processing system is expected or unexpected for a user of the data processing system. Refer to the discussion of FIG. 2B for more information regarding inferencing processes.

To manage inference models, service systems 104 may store the trained inference models in a repository (not shown). The repository may store and/or provide access to any number of inference models (e.g., model data, trained model data). For example, the repository may provide trained model data 208 to a system of service systems 104 for use in inference generation and/or to training process 204 for further training.

For example, trained model data 208 may be updated during training process 204. Training process 204 may implement incremental learning methods to update aged inference models (e.g., previously trained inference models). For example, trained model data 208 may be updated during training process 204 when new training data is available for training model data 208. As updated instances of trained inference models are obtained, the trained inference models may be evaluated (e.g., tested, using portions of training data designated for doing so). Consequently, as part of the inference model management process, service systems 104 may remove and/or replace different instances of the inference model stored in the repository.

Thus, as illustrated in FIG. 2A, the system of FIGS. 1A-1B may obtain and/or train (e.g., update, incrementally) inference models usable to analyze behavior data for a data processing system. The inference models may be managed and/or implemented by remote systems (e.g., service systems 104) to classify activity of the data processing system as expected or unexpected for the user. By doing so, the inference models may be employed to detect undesired use of the data processing system that may be attributed to irregular user and/or device behavior.

In an embodiment, the one or more entities performing the operations shown in FIG. 2A are implemented using a processor adapted to execute computing code stored on a persistent storage that when executed by the processor performs the functionality of the system of FIGS. 1A-1B discussed throughout this application. The processor may be a hardware processor including circuitry such as, for example, a central processing unit, a processing core, or a microcontroller. The processor may be other types of hardware devices for processing information without departing from embodiments disclosed herein.

Figure 2B:
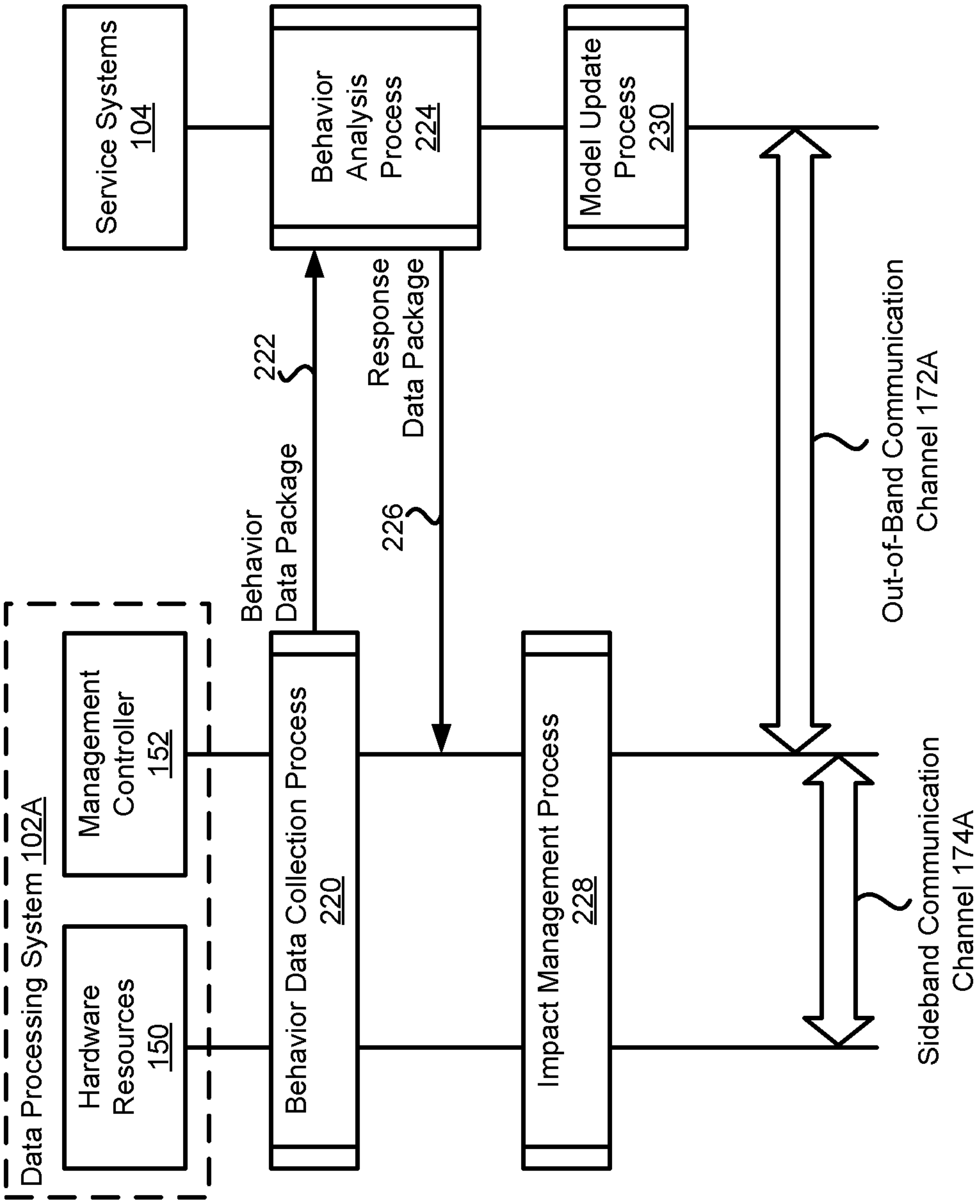
FIG. 2B shows an interaction diagram in accordance with an embodiment.

To further clarify embodiments disclosed herein, an interaction diagram in accordance with an embodiment is shown in FIG. 2B. The interaction diagram may illustrate an example of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 150, 152, etc.), located towards the top of each figure. Lines descend from these shapes. Processes performed by the components of the system are illustrated using a second set of shapes (e.g., 220, 224 etc.) superimposed over these lines.

Interactions (e.g., communication, data transmissions, etc.) between the components of the system are illustrated using a third set of shapes (e.g., 222, 226, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 222 may occur prior to the interaction labeled as 226. However, it will be appreciated that the processes and interactions may be performed in different orders, any may be omitted, and other processes or interactions may be performed without departing from embodiments disclosed herein.

The processes shown in FIG. 2B may be performed by any entity shown in the systems of FIGS. 1A-1B (e.g., a device similar to one of data processing systems 102, systems similar to service systems 104, etc.) and/or another entity without departing from embodiments disclosed herein.

Turning to FIG. 2B, a first interaction diagram in accordance with an embodiment is shown. The first interaction diagram may illustrate processes and interactions that may occur in order to detect and/or manage undesired use of a data processing system. For example, data processing system 102A may include a portable device that may provide computer-implemented services. As discussed with respect to FIGS. 1A-1B, data processing system 102A may include hardware resources 150 and management controller 152.

Over time, data processing system 102A may respond to behavior of a user of data processing system 102A. For example, the user may provide input to data processing system, physically relocate data processing system 102A, etc., causing data processing system 102A to generate behavior data based on the behavior of the user. The behavior data (e.g., location data, activity data, user data, access data, etc.) may be generated in real-time and/or may be stored by data processing system 102A (e.g., in hardware resources 150).

Management controller 152 may initiate behavior data collection process 220 based on a schedule, when prompted (e.g., when new behavior data is detected), and/or for other reasons. Behavior data collection process 220 may include an ongoing process managed by management controller 152. Behavior data collection process 220 may include collecting (e.g., obtaining) behavior data for data processing system 102A.

To do so, management controller 152 may obtain behavior data such as location data from a network module of data processing system 102A via an out-of-band communication channel (not shown). Management controller 152 may obtain behavior data from (e.g., stored in and/or generated by) hardware resources 150 via sideband communication channel 174A. For example, management controller 152 may read behavior data from storage and/or snoop activity of hardware resources 150 to obtain a portion of the behavior data. The behavior data collected during behavior data collection process 220 may include additional data, such as aggregate summaries of the behavior data, statistics generated based on the behavior data, and/or other data that may be derived from or generated based on the behavior data.

Behavior data collection process 220 may occur while hardware resources 150 are unpowered. For example, management controller 152 may manage power to a portion of unpowered hardware resources 150 in order to obtain behavior data. Management controller 152 may obtain the behavior data from compromised hardware resources 150 surreptitiously, reducing the likelihood of the behavior data being intercepted and/or modified by an attacker intending to conceal activity of data processing system 102A.

Behavior data collection process 220 may include obtaining a behavior data package. The behavior data package may include, for example, (i) the collected behavior data, (ii) identifying information (e.g., a device identifier for data processing system 102A, a user identifier, etc.), and/or (iii) other data (e.g., authentication information, etc.).

At interaction 222, the behavior data package may be provided to service systems 104 by management controller 152. For example, the behavior data package may be generated and provided to service systems 104 via out-of-band communication channel 172A through (i) transmission via a message, (ii) storing in a storage with subsequent retrieval by service systems 104, (iii) a publish-subscribe system where service systems 104 subscribes to updates from management controller 152 thereby causing a copy of the behavior data package to be propagated to service systems 104, and/or (iv) other processes. By providing the behavior data package to service systems 104, service systems 104 may provide behavior analysis services.

Service systems 104 may authenticate management controller 152 and/or the behavior data package based on information included in the behavior data package. Once authenticated, service systems 104 may perform behavior analysis process 224 using the behavior data. Behavior analysis process 224 may include monitoring incoming behavior data for data processing system 102A. To do so, behavior analysis process 224 may include performing an inferencing process using an inference model trained to detect unexpected activity of data processing system 102A upon ingesting the behavior data. Refer to FIG. 2A for more information regarding training inference models.

Service systems 104 may select a trained inference model (e.g., trained model data from a repository, not shown) to use in the inferencing process based on identifying information included in the behavior data package (e.g., identifiers for data processing system 102A and/or the user). Portions of the behavior data may be input to (e.g., ingested by) the selected inference model in order to generate an inference that may indicate a classification of whether the behavior data indicates unexpected or expected activity of data processing system 102A. The inference may also include information that indicates whether data processing system 102A is likely to be compromised as part of an attack, an intent of the attack, etc. The inferencing process may generate any number of inferences associated with any number of portions of the behavior data. For example, different portions of the behavior data may indicate unexpected activity of data processing system 102A.

Behavior analysis process 224 may include identifying policies for data processing system 102A that are triggered by unexpected activity of data processing system 102A. When unexpected activity is detected (e.g., when an inference of the inferencing process indicates activity ascribed to the user is unexpected for data processing system 102A), a policy for data processing system 102A may be triggered.

For example, unexpected activity for data processing system 102A may include obtaining (e.g., generating, by a network module of data processing system 102A) location data for data processing system 102A that indicates that data processing system 102A is located in an unexpected geographical area. The presence of data processing system 102A in the unexpected geographical area may trigger one or more policies for data processing system 102A. For example, a policy may specify that, while data processing system 102A is located in the unexpected geographical area, a portion of functionality of data processing system 102A is to be limited.

Behavior analysis process 224 may include obtaining an action set, based on the behavior data (e.g., unexpected activity indicated by the behavior data). The action set may include actions that, when performed, may enforce (triggered) policies. For example, the action set may include (i) instructions for disabling a portion of hardware resources of data processing system 102A (e.g., a trusted platform module (TPM)), (ii) instructions for disabling a piece of software hosted by hardware resources 150, and/or (iii) instructions for other actions that my update operation of data processing system 102A to conform with a policy thereof.

Behavior analysis process 224 may also include obtaining (e.g., generating) a response to the provided behavior data. For example, if expected activity is detected during behavior analysis process 224, then the response may include a lack of communication from service system 104. If unexpected activity is detected during behavior analysis process 224, then the response may include (i) a message indicating that unexpected activity is detected based on the behavior data, (ii) the action set, and/or (iii) other data (e.g., authentication information, etc.).

Service systems 104 may also provide notifications to other (remote) systems that may, for example, monitor activity and/or use of data processing systems (e.g., 102A). The notification may include any information obtained and/or generated during behavior analysis process 224. For example, the notification may include identifying information (e.g., for data processing system 102A and a user thereof), behavior data, inference information (e.g., time of unexpected activity and/or details of the unexpected activity), etc. Information included in the notification may be used (e.g., analyzed, by administrators and/or devices) to reduce the likelihood of data processing systems (e.g., 102A) becoming subject to undesired use (e.g., compromise) in the future.

At interaction 226, the response data package may be provided to management controller 152 by service systems 104. For example, the response data package may be generated and provided to management controller 152 via out-of-band communication channel 172A through (i) transmission via a message, (ii) storing in a storage with subsequent retrieval by management controller 152, (iii) a publish-subscribe system where management controller 152 subscribes to updates from service systems 104 thereby causing a copy of the response data package to be propagated to management controller 152, and/or (iv) other processes. By providing the response data package to management controller 152, management controller 152 may manage use of data processing system 102A.

To manage use of data processing system 102A, management controller 152 may obtain the response data package. Upon obtaining the response data package (e.g., after authenticating service systems 104 and/or the response data package), management controller 152 may read its contents. For example, the response data package my specify unexpected activity of data processing system 102A is detected; therefore, undesired use of data processing system 102A may be likely. To manage an impact of the (likely) undesired use, management controller 152 may be prompted to initiate impact management process 228.

Impact management process 228 may include updating operation of data processing system 102A in accordance with one or more (triggered) policies. To do so, impact management process 228 may include performing one or more actions of the action set included in the response data package. Impact management process 228 may be performed directly by management controller 152 and/or in conjunction with hardware resources 150. For example, to perform the one or more actions, management controller 152 may communicate with hardware resources 150 over sideband communication channel 174A.

Performing (one or more actions of) the action set may include, for example, (i) disabling (or enabling) one or more of hardware resources 150, (ii) disabling (or enabling) one or more pieces of software hosted by hardware resources 150, (iii) increasing (or decreasing) authentication requirements (e.g., for access to a portion of functionality of data processing system 102A), (iv) removing a portion of data stored by data processing system 102A, (v) modifying the boot process for data processing system 102A, and/or (vi) other actions that my result in updated operation of data processing system 102A.

Disabling or enabling hardware and/or software may include, for example, encrypting portions of data stored by data processing system 102A, limiting the use of applications (e.g., or a portion of functionality of the applications) hosted by hardware resources 150. For example, management controller 152 may disable all functionality of data processing system 102A (e.g., prevent hardware resources 150 from being powered), and/or management controller 152 may continue to perform location monitoring and/or location reporting processes (e.g., reporting location data to other devices via out-of-band communications). Any functionality may be modified, limited, etc., for a period of time and/or until applicable policies indicate the functionality should be enabled.

During impact management process 228, management controller 152 may, for example, disable technology based on trade secrets and/or hardware resources 150 that may limit functionality of data processing system 102, such as a TPM of data processing system 102A. For example, by disabling the TPM, access to and/or use of secrets stored by the TPM may be prevented. Consequently, data decryption functionality may be lost, signing ability of data structures for device verification may be lost, etc., which may increase the security of data stored by and/or accessible by data processing system 102A.

Modifying the boot process for data processing system 102A may include updating instructions used by and/or providing instructions to the basic input output system (BIOS). For example, the BIOS may verify a use status of data processing system 102A before and/or during performance of a boot process for an operating system installed on data processing system 102A. The use status may be verified by reading boot instructions (e.g., updated by management controller 152) and/or other types of data structures in which the use status may be stored. Based on the boot instructions, different boot paths may be taken. For example, the operating system may not load, portions of the operating system may be loaded, and/or other boot processes may be performed that result in limitations on the functionality of the device.

Once impact management process 228 has completed, the operation of data processing system 102A may be updated to reduce the likelihood of undesired use of data processing system 102A, and impacts of undesired use of data processing system 102A may be mitigated or avoided.

As discussed with respect to FIG. 2A, service systems 104 may manage inference models (e.g., used in inferencing processes included in behavior analysis process 224). As part of managing the inference models, service systems 104 may perform model update process 230. Model update process 230 may be similar to training process 204 of FIG. 2A. Model update process 230 may be initiated by service systems 104 when any number of conditions are met for updating a given inference model (e.g., new and/or sufficient training data is available, updates are to be performed based on a schedule, etc.). Model update process 230 may include, for example, training aged (e.g., previously trained) inference models using newly available training data. The further trained (e.g., updated) inference models may be used in future inferencing processes.

Thus, as shown in the example of FIG. 2B, use of a data processing system may be managed using out-of-band methods. The out-of-band components of data processing system 102A may collect behavior data for the data processing system (e.g., automatically, in real-time). The behavior data may be provided to remote systems via out-of-band communication channels that may monitor (e.g., analyze) the behavior data in order to detect unexpected activity of the data processing system. When unexpected activity is detected, the remote systems may prompt the out-of-band components to manage an impact of the unexpected activity by modifying operation of the data processing system. The modified operation may protect the data processing system from undesired use.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to manage (undesired) use of data processing systems using out-of-band methods. By doing so, impacts of undesired use of the data processing systems may be managed in a timely and trustworthy manner, which may prevent or reduce the impacts.

FIGS. 3A-3B illustrate a method that may be performed by the components of the system of FIGS. 1A-2B. In the diagrams discussed below and shown in FIGS. 3A-3B, any of the operations may be repeated, performed in different orders, and/or performed in parallel with or in a partially overlapping in time manner with other operations. The method described with respect to FIGS. 3A-3B may be performed by a data processing system (e.g., of data processing system 102A) and/or another device.

Turning to FIG. 3A, at operation 302, behavior data for the data processing system may be provided to a service system via an out-of-band communication channel (e.g., established between the service system and a management controller of the data processing system). The behavior data may be provided by methods similar those discussed with respect to FIG. 2B (e.g., interaction 222) and/or by other methods.

The behavior data may include any type of data indicating activity of the data processing system, and the activity may be ascribed to a user of the data processing system. For example, input from and/or actions performed by the user may cause the activity of the data processing system. Therefore, the behavior data may reflect undesired use of the data processing system. The behavior data may include data generated by, stored by, and/or accessible to the data processing system. Refer to FIGS. 2A-2B for more information regarding behavior data.

The behavior data may be provided to the service system while a portion of the hardware resources are inoperable due to being unpowered by virtue of the management controller (i) being powered independently from hardware resources, and/or (ii) managing power distribution to portions of the hardware resources as needed. Refer to FIG. 1B for more information regarding components of the data processing system.

At operation 304, a response to the provided behavior data may be obtained from the service system via the out-of-band communication channel. The response may be obtained by methods similar to those discussed with respect to FIG. 2B (e.g., interaction 226) and/or by other methods. The response may indicate whether the activity ascribed to the user is expected for the user.

For example, prior to obtaining the response, the service system may perform an inferencing process using the behavior data in order to generate the response. The inferencing process may include providing the behavior data to an inference model as ingest data, the inference model being trained to classify the activity of the data processing system ascribed to the user (e.g., as indicated by the behavior data) as expected or unexpected. Unexpected activity of the data processing system may indicate undesired use of the data processing system. Refer to the discussion of FIG. 2A for more details regarding inference models.

The response may be obtained by the management controller while a portion of the hardware resources are inoperable due to being unpowered by virtue of the management controller including functionality for communicating with the service system through the network controller independently of the hardware resources and/or in-band communication channels. Refer to FIG. 1B for more information regarding components of the data processing system.

At operation 306, a determination may be made regarding whether the response indicates that the activity ascribed to the user is unexpected for the user. The determination may be made by reading the response. For example, the message may include a message indicating that unexpected activity of the data processing system is detected by the service system. Or, for example, the response may include a lack of any communication from the service system, indicating that unexpected activity is not detected by the service system. If the activity ascribed to the user is unexpected, then the method may proceed to operation 308 (via path "A", shown in FIG. 3B). Otherwise, the method may proceed to operation 312 (via path "B", shown in FIG. 3B).

Turning to FIG. 3B, at operation 308, following path "A", an action set may be obtained from the service system via the out-of-band communication channel. The action set may be obtained by methods similar to those discussed with respect to FIG. 2B (e.g., interaction 226) and/or by other methods. For example, the action set may be included along with the response (e.g., as part of a response data package) obtained at operation 304. The action set may be based on the behavior data (e.g., the unexpected activity). For example, when analyzing the behavior data, the service system may identify that a policy for the data processing system has been triggered. Thus, the action set may include actions that the management controller may perform in response to the behavior data in order to enforce the policy.

At operation 310, performance of the action set may be initiated to update operation of the data processing system. The action set may be initiated by (i) obtaining (e.g., generating) instructions based on the action set, and/or (ii) executing the instructions in order to update the operation of the data processing system (e.g., enabling or disabling hardware and/or software, initiating processes, updating configuration settings, downloading data, installing software, etc.). Refer to the discussion of FIG. 2B for more details regarding action sets.

The updated operation of the data processing system may include continuing to collect and/or provide behavior data to the service systems (e.g., for continued monitoring of use of the data processing system). The updated data processing system may be more resistant undesired use of the data processing system than the prior operation of the data processing system. Therefore, by initiating performance of the action set (e.g., and/or by performing at least one action of the action set), an impact of the undesired use of the data processing system may be managed (e.g., mitigated and/or prevented).

The method may end following operation 310.

Returning to operation 306 of FIG. 3A, the method may proceed, via path "B", to operation 312 when it is determined that the activity ascribed to the user is not unexpected (e.g., expected).

Returning to FIG. 3B, at operation 312, following path "B", desired use of the data processing system reflected in the behavior data may continue to be allowed. Desired use may be allowed by continuing to (i) enable power distribution to the hardware resources, (ii) enable software hosted by the hardware resources, (iii) enable full functionality of the hardware resources, and/or (iv) by other methods.

Continuing to allow desired use may include collecting behavior data for the data processing system, providing behavior data to the service systems, obtaining responses from the service systems regarding the behavior data, and/or performing actions to manage use of the data processing system. Continuing to allow desired use may include providing, by the data processing system a computer-implemented service (e.g., consumed by the user and/or other entities). For example, the computer-implemented service may be provided by initiating functionality of the hardware resources. For example, the user may initiate execution of computer instructions that may be performed by the hardware resources of the data processing system.

The method may end following operation 312.

As illustrated above, embodiments disclosed herein may provide systems and methods usable to manage use of data processing systems by using out-of-band methods. By performing processes for monitoring and/or responding to undesired use of the data processing system without relying on in-band methods (which may be inoperable and/or unsecure), the likelihood of the likelihood of effectively managing impacts of undesired use of the data processing system may be increased.

The use and operation of the data processing system may be managed according to policies automatically and/or in real-time, reducing the likelihood of service disruptions, policy violations, and/or security issues that may arise while providing computer-implemented services. Accordingly, the disclosed process provides for both an embodiment in computing technology and an improved method for managing the security of data processing systems.

Figure 4:
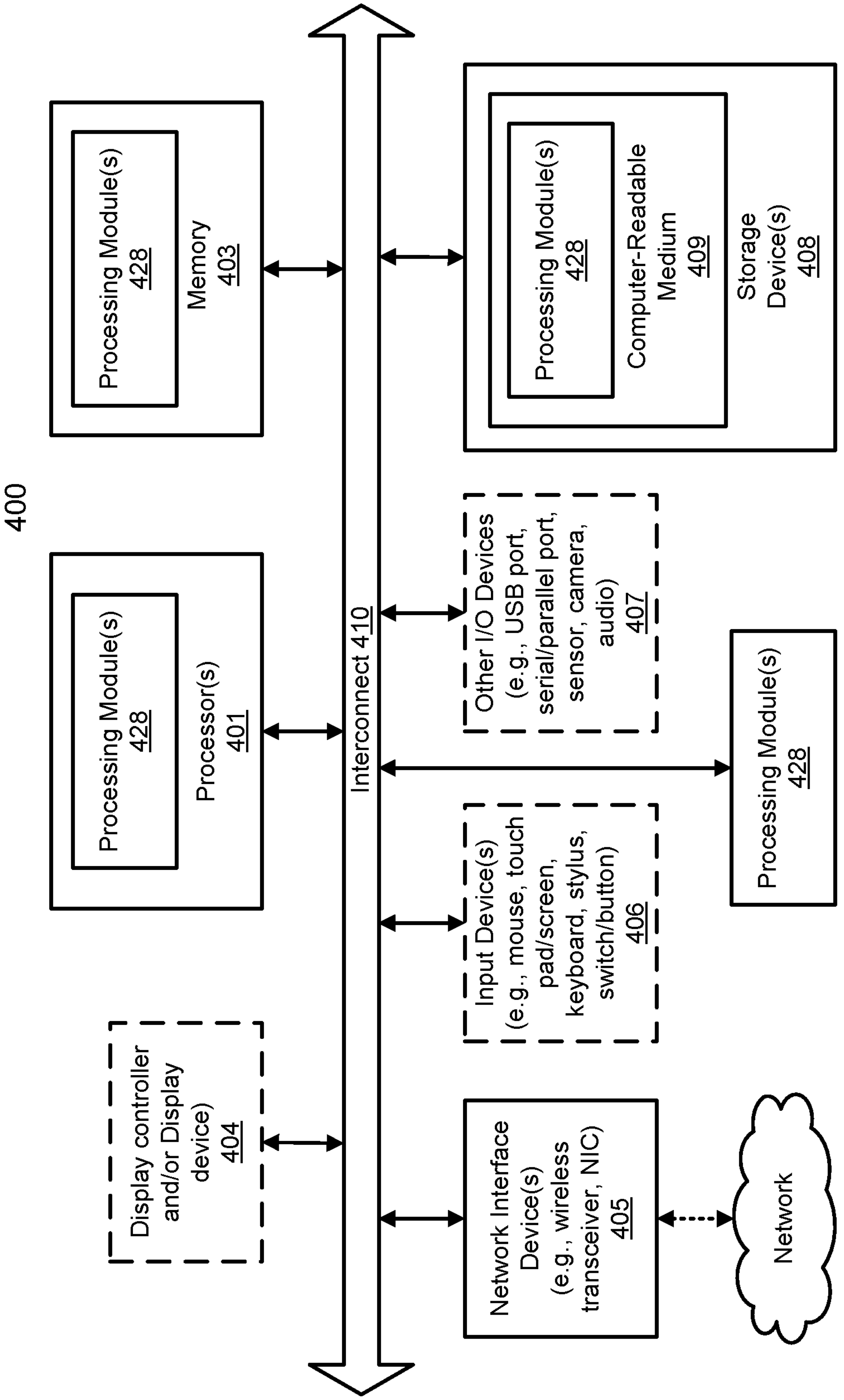
FIG. 4 shows a block diagram illustrating a data processing system in accordance with an embodiment.

Any of the components illustrated in FIGS. 1A-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

collecting, by a management controller of the data processing system and using sideband channels provided within the data processing system, behavior data for the data processing system by at least snooping activity data of hardware resources of the data processing system and collecting location data of the data processing system from a network module of the data processing system, the behavior data indicating activity of the data processing system ascribed to a user of the data processing system, the hardware resources comprising a motherboard of the data processing system, and the collecting of the behavior data by the management controller being performed separately and independently from a collecting of the behavior data by the hardware resources;

providing, by the management controller of the data processing system and via an out-of-band communication channel without any connections with and that bypasses hardware resources, the behavior data for the data processing system to a service system, the hardware resources being unaware that the management controller provided the behavior data to the service system;

obtaining, by the management controller and via the out-of-band communication channel and from the service system, a response to the provided behavior data, the response indicating whether the activity of the data processing system ascribed to the user is expected for the user; and in a first instance of the obtaining where the response indicates that the activity of the data processing system ascribed to the user is unexpected for the user:

obtaining, by the management controller and via the out-of-band communication channel and from the service system, an action set, the action set being based on the behavior data, and initiating, by the management controller, performance of the action set to update operation of the data processing system to manage an impact of undesired use of the data processing system reflected in the behavior data.

2. The method of claim 1, wherein the behavior data further comprises:

user data stored by the data processing system; and access data for the data processing system.

3. The method of claim 1, further comprising:

performing, by the service system, an inferencing process using the behavior data to obtain the response.

4. The method of claim 3, further comprising:

updating, using an incremental learning method and previously collected behavior data, an aged inference model to obtain an inference model used in the inferencing process.

5. The method of claim 1, wherein the activity of the data processing system ascribed to the user that is unexpected for the user indicates that location data that indicates that the data processing system is located in an unexpected geographical area was obtained.

6. The method of claim 1, wherein the action set comprises disabling, by the management controller, a portion of the hardware resources of the data processing system.

7. The method of claim 6, wherein the portion of the hardware resources comprises a trusted platform module.

8. The method of claim 1, wherein the action set comprises disabling a piece of software hosted by hardware resources of the data processing system.

9. The method of claim 1, further comprising:

in a second instance of the obtaining where the response indicates that the activity of the data processing system ascribed to the user is expected for the user:

continuing, by the management controller, to allow desired use of the data processing system reflected in the behavior data.

10. The method of claim 9, wherein when in the second instance of the obtaining, the response comprises a lack of any communication from the service system regarding whether the activity of the data processing system ascribed to the user is expected for the user based on the behavior data.

11. The method of claim 1, wherein the the network module is a single network module that is shared by both the management controller and the hardware resources, the single network module being adapted to separately advertise network endpoints for the management controller and hardware resources of the data processing system to the service system and comprises a first network stack for use by only the management controller and a second network stack for use by only the hardware resources, the first network stack and the second network stack being transmission control protocol/internet protocol (TCP/IP) network stacks and are distinct and independent form one another.

12. The method of claim 11, wherein the management controller and the single network module are on separate power domains from the hardware resources so that the management controller and the single network module are operable while the hardware resources are inoperable.

13. The method of claim 12, wherein the behavior data is provided to the service system while a portion of the hardware resources are inoperable due to being unpowered.

14. The method of claim 13, wherein the response is obtained by the management controller while a portion of the hardware resources are inoperable due to being unpowered.

15. The method of claim 11, wherein the out-of-band communication channel runs through the single network module, and an in-band communication channel that services the hardware resources also runs through the single network module.

16. The method of claim 11, wherein the network endpoints that are separately advertised by the single network module shared by the management controller and the hardware resources are usable by the service system to address communications separately to each of the hardware resources and the management controller such that first communications among the communications that are meant for the hardware resources never flow through the management controller and second communications among the communications that are meant for the management controller never flow through the hardware resources.

17. A non-transitory machine-readable medium having instructions stored therein, which when executed by a processor, cause the processor to perform operations for managing a data processing system, the operations comprising:

collecting, by a management controller of the data processing system and using sideband channels provided within the data processing system, behavior data for the data processing system by at least snooping activity data of hardware resources of the data processing system and collecting location data of the data processing system from a network module of the data processing system, the behavior data indicating activity of the data processing system ascribed to a user of the data processing system, the hardware resources comprising a motherboard of the data processing system, and the collecting of the behavior data by the management controller being performed separately and independently from a collecting of the behavior data by the hardware resources;

providing, by the management controller of the data processing system and via an out-of-band communication channel without any connections with and that bypasses hardware resources, the behavior data for the data processing system to a service system, the hardware resources being unaware that the management controller provided the behavior data to the service system;

obtaining, by the management controller and via the out-of-band communication channel and from the service system, a response to the provided behavior data, the response indicating whether the activity of the data processing system ascribed to the user is expected for the user; and in a first instance of the obtaining where the response indicates that the activity of the data processing system ascribed to the user is unexpected for the user:

obtaining, by the management controller and via the out-of-band communication channel and from the service system, an action set, the action set being based on the behavior data, and initiating, by the management controller, performance of the action set to update operation of the data processing system to manage an impact of undesired use of the data processing system reflected in the behavior data.

18. The non-transitory machine-readable medium of claim 17, wherein the behavior data further comprises:

user data stored by the data processing system; and access data for the data processing system.

19. A data processing system, comprising:

a processor; and a memory coupled to the processor to store instructions, which when executed by the processor, cause the processor to perform operations for managing the data processing system, the operations comprising:

collecting, by a management controller of the data processing system and using sideband channels provided within the data processing system, behavior data for the data processing system by at least snooping activity data of hardware resources of the data processing system and collecting location data of the data processing system from a network module of the data processing system, the behavior data indicating activity of the data processing system ascribed to a user of the data processing system, the hardware resources comprising a motherboard of the data processing system, and the collecting of the behavior data by the management controller being performed separately and independently from a collecting of the behavior data by the hardware resources;

providing, by the management controller of the data processing system and via an out-of-band communication channel without any connections with and that bypasses hardware resources, the behavior data for the data processing system to a service system, the hardware resources being unaware that the management controller provided the behavior data to the service system, obtaining, by the management controller and via the out-of-band communication channel and from the service system, a response to the provided behavior data, the response indicating whether the activity of the data processing system ascribed to the user is expected for the user, and in a first instance of the obtaining where the response indicates that the activity of the data processing system ascribed to the user is unexpected for the user:

obtaining, by the management controller and via the out-of-band communication channel and from the service system, an action set, the action set being based on the behavior data; and initiating, by the management controller, performance of the action set to update operation of the data processing system to manage an impact of undesired use of the data processing system reflected in the behavior data.

20. The data processing system of claim 19, wherein the behavior data further comprises:

user data stored by the data processing system; and access data for the data processing system.

* * * * *